6 Sheets—Sheet 2.
J. A. MATHIEU.
Furnace for Distilling Wood and Separating the Products of Distillation.
No. 208,835. Patented Oct. 8, 1878.
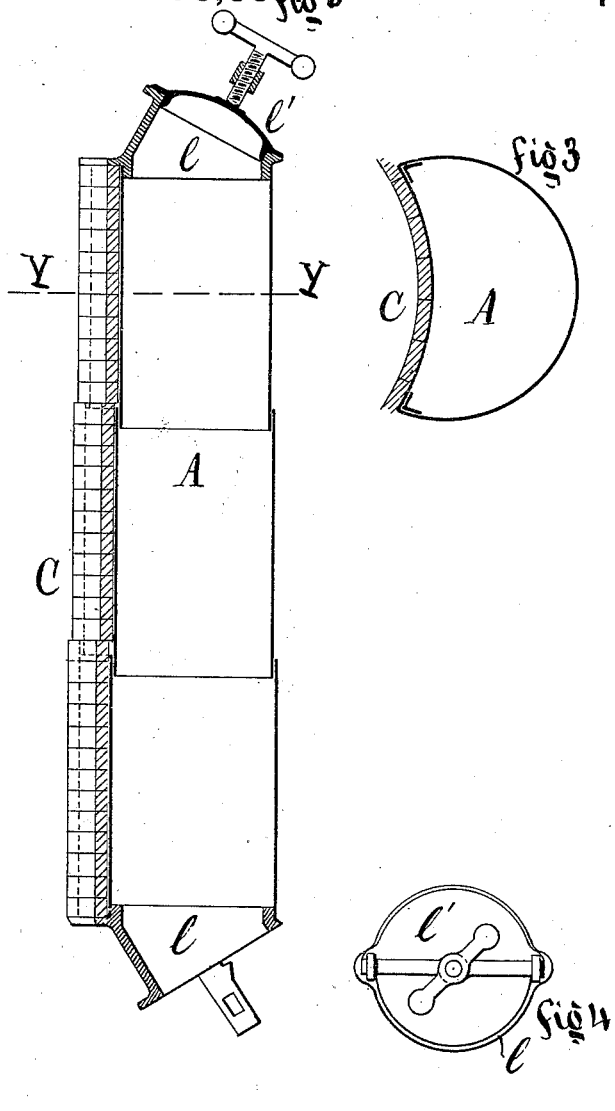
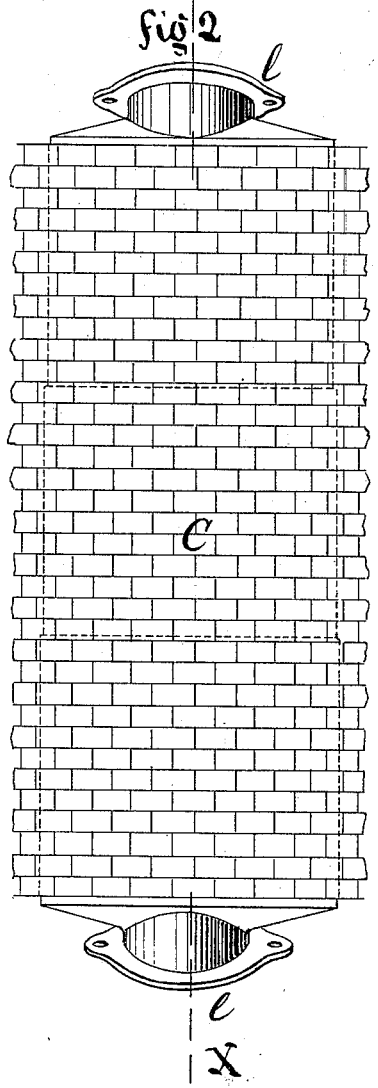

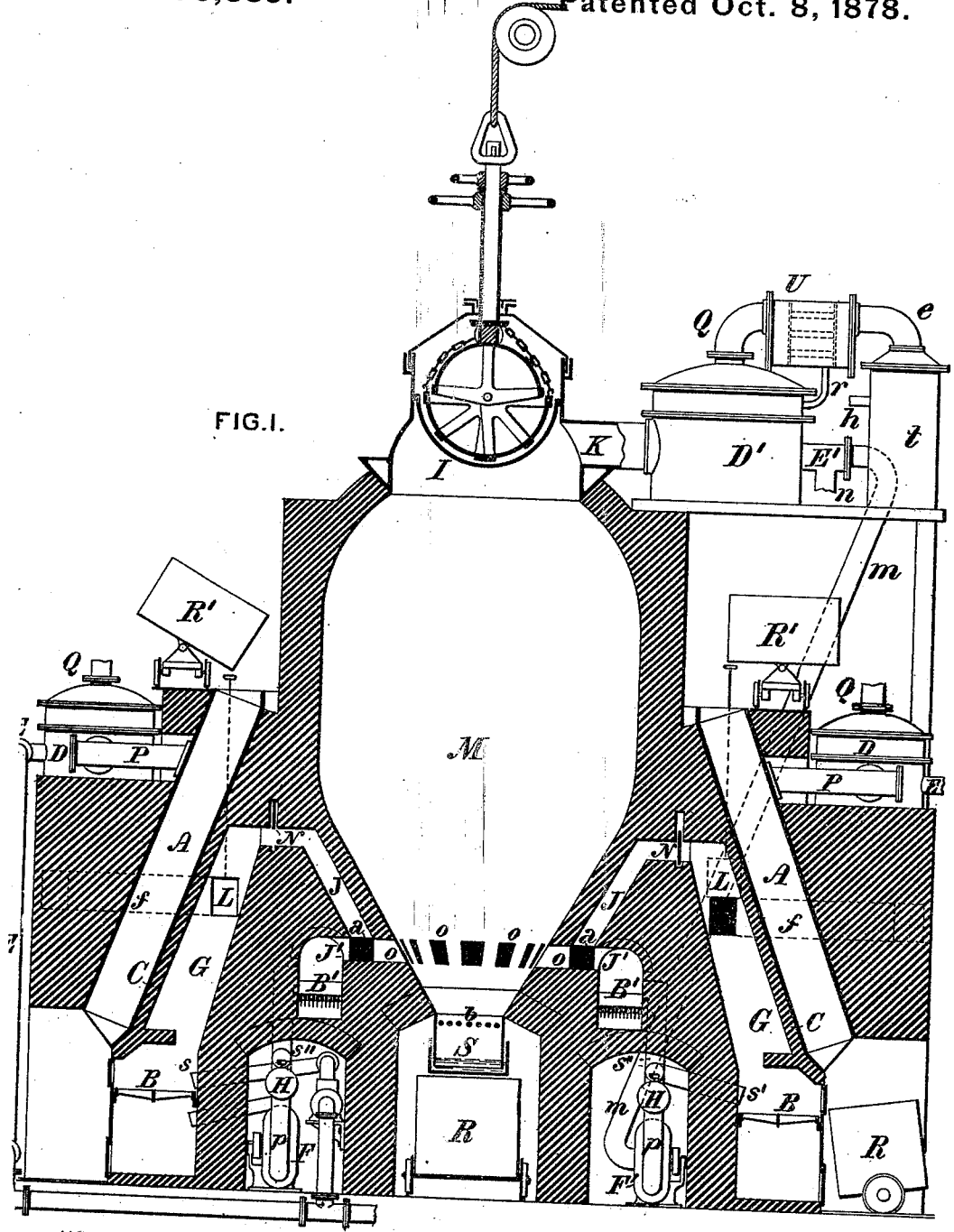

J. A. MATHIEU.
Furnace for Distilling Wood and Separating the Products of Distillation.
No. 208,835. Patented Oct. 8, 1878.
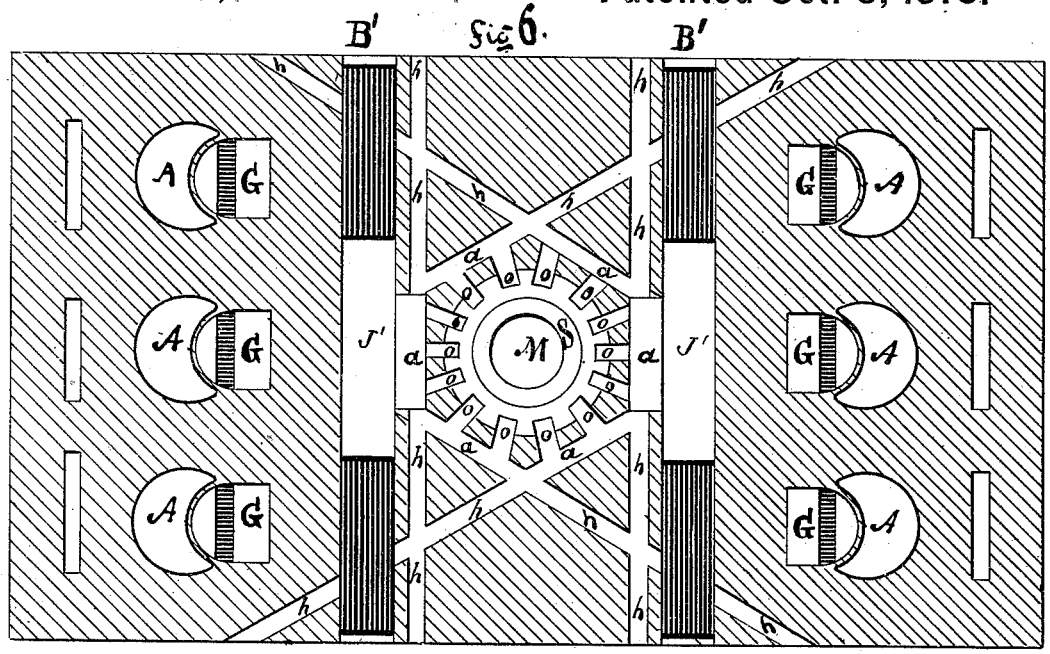
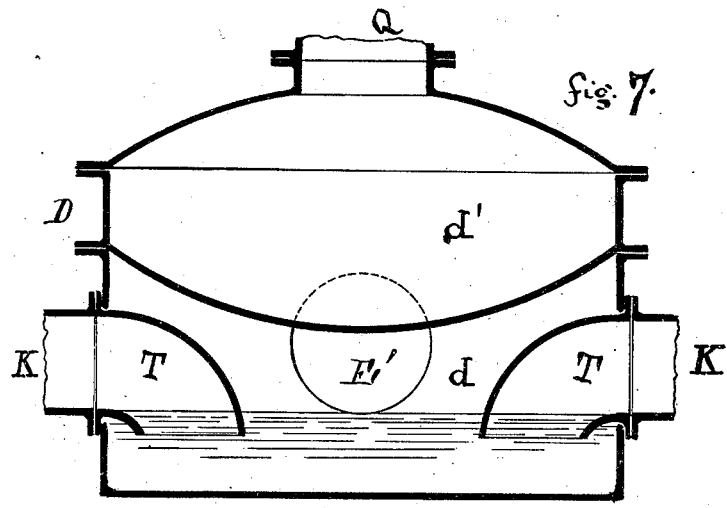
Witnesses
C. A. Curtis
E. Augentobler
Inventor
Jean Antoine Mathieu J. A. MATHIEU.
Furnace for Distilling Wood and Separating the Products of Distillation.
No. 208,835. Patented Oct. 8, 1878.
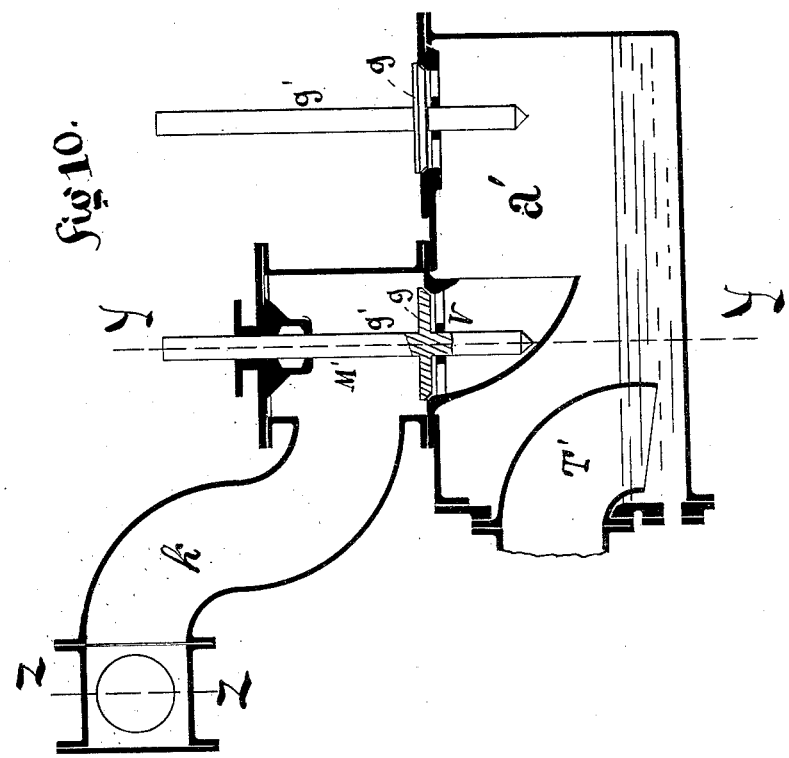
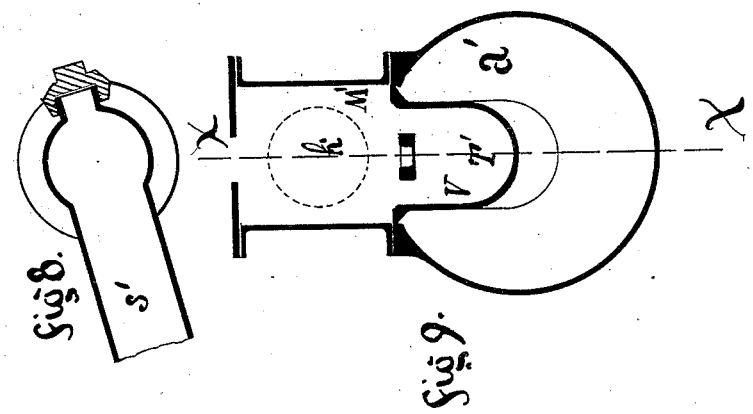

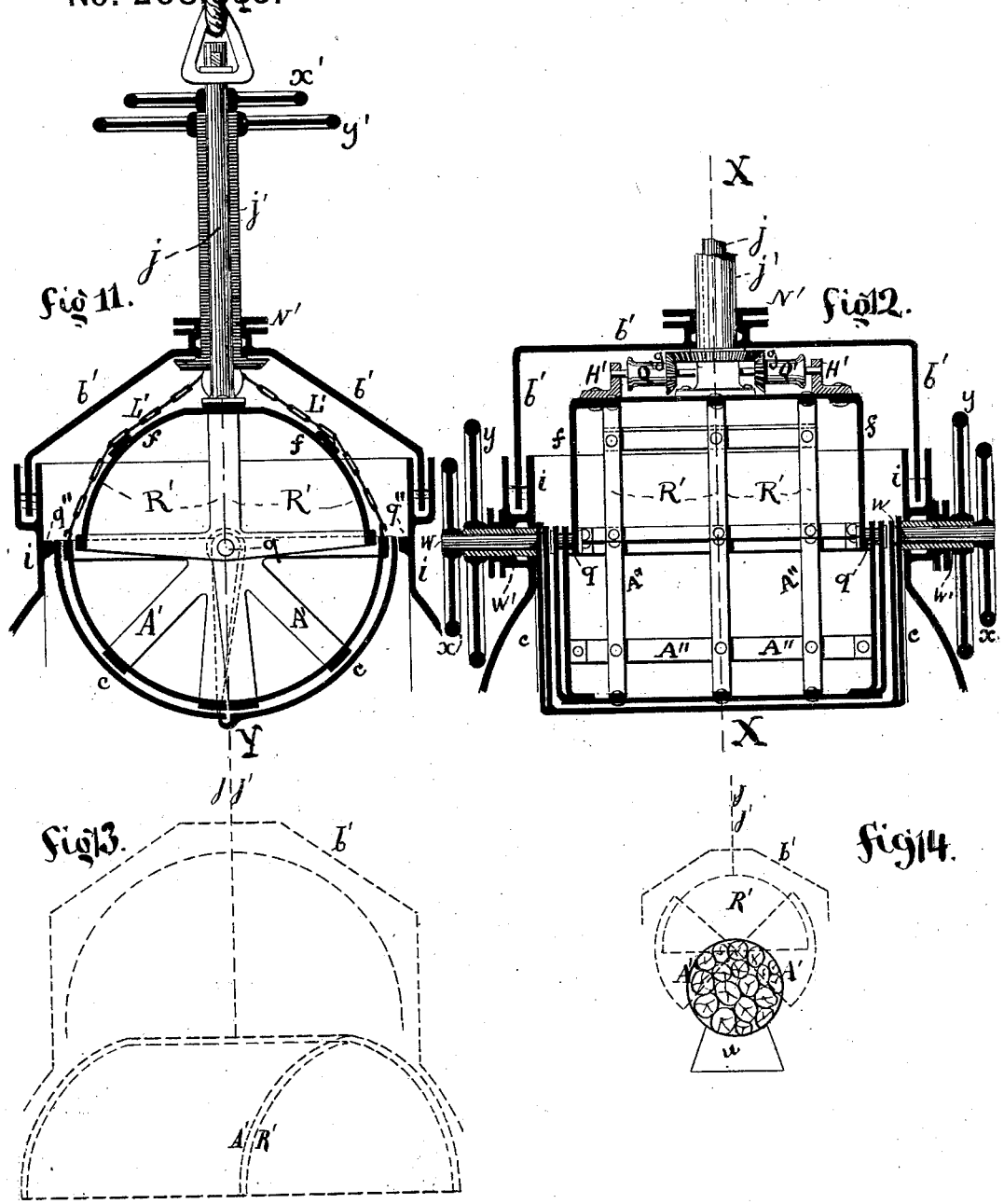

J. A. MATHIEU.
Furnace for Distilling Wood and Separating the Products of Distillation.

No. 208,835. Patented Oct. 8, 1878.

Witnesses,
Richard S. Hunter,
Jos. C. Fraley.

Inventor,
Jean Antoine Mathieu.

UNITED STATES PATENT OFFICE.

JEAN A. MATHIEU, OF BRIDESBURG, PHILADELPHIA, PENNSYLVANIA.

IMPROVEMENT IN FURNACES FOR DISTILLING WOOD AND SEPARATING THE PRODUCTS OF DISTILLATION.

Specification forming part of Letters Patent No. 208,835, dated October 8, 1878; application filed March 15, 1877.

*To all whom it may concern:*

Be it known that I, JEAN ANTOINE MATHIEU, a native of France, but now residing in Philadelphia, in the county of Philadelphia and State of Pennsylvania, have invented certain new and useful Improvements in Apparatus for Distilling Wood and Separating the Gaseous and Liquid Products of Distillation and the Charcoal Residuum, which improvements are fully set forth in the annexed specification, reference being had to the accompanying drawings.

Figure 15:
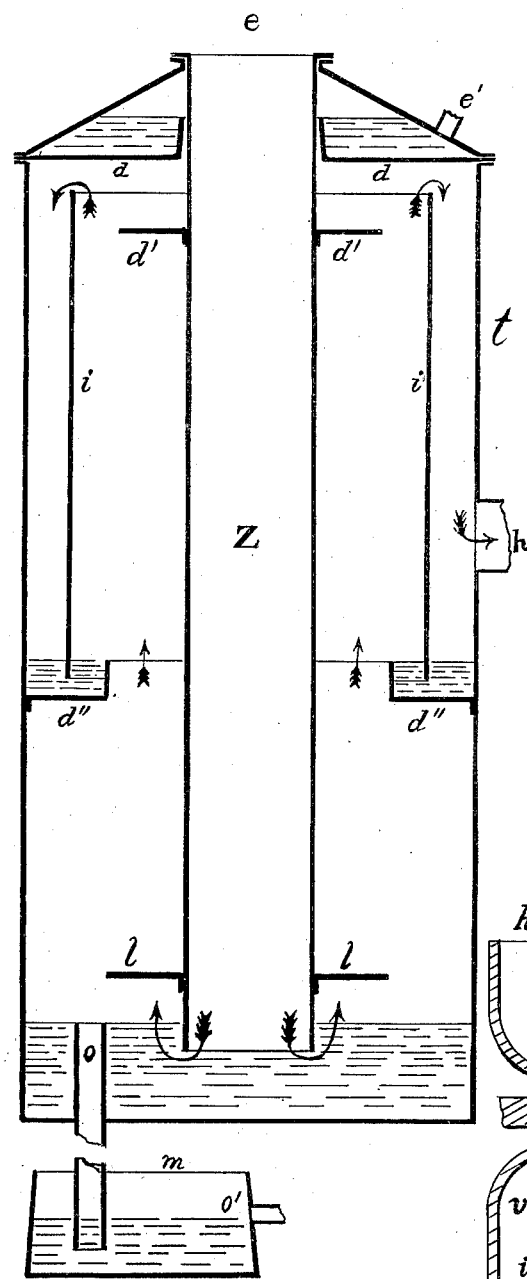
Figure 16:
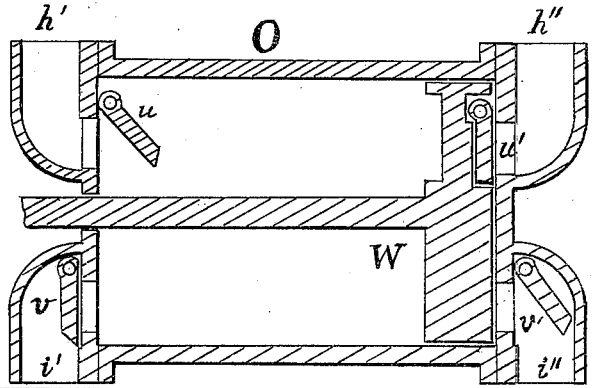

Of these, Figure 1 represents a section through the entire apparatus, showing the relative position of its parts. Figs. 2, 3, 4, and 5 show the details of the lesser retorts. Fig. 6 represents a horizontal section through the entire apparatus on a line running through the letters $o\ o\ o\ o$ of Fig. 1. Fig. 7 shows the details of the condensers D and D'. Figs. 8, 9, and 10 show the details of the safety apparatus H. Figs. 11, 12, 13, and 14 show the details of the device for introducing wood into the main retort. Fig. 15 is a section through the cascade-condenser, and Fig. 16 a section through the air-pump attached thereto.

The nature and advantages of the various combinations embodied in my invention are set forth in detail when pertinent to the description of the parts respectively. In their entirety, however, they enable me to economize all the heat from the various retorts, and without the danger of explosions, which has hitherto been an objectionable feature of such devices for conducting distillation by inter-communication. A similar economy in producing the cold necessary for condensation is effected, and I am thus enabled to produce a highly-rectified pyroligneous acid and a very pure charcoal in less time and with less expense than have heretofore been deemed possible.

In Fig. 1, M indicates the main retort, around which are placed, in an inclined position, the lesser retorts A A. These latter are preferably inclined at an angle of about sixty degrees, as shown, which insures the free rise of the distilled gases away from the heating-surfaces. They are heated by fires on the closed grates B B, into which air is forced by fans F, and are so constructed that wood can be introduced at the top and charcoal discharged at the bottom without removing them from their settings or drawing the fires beneath. Pipes P connect these retorts with condensers D, the peculiar construction of which is shown in Fig. 7. The condensers D have exit-pipes E, through which the non-condensable gases, after being separated from the liquid products, are forced down by the pressure in the retorts through the safety apparatus H and spouts $s$, which lead into the closed grates B. Uptakes G G from the grates B lead, by flues J J, into channels $a\ a\ a$, which surround the bottom of the main retort M. N are dampers, by which these flues can be closed. The details of the channels $a\ a$ are shown in Fig. 6, and from them spouts $o\ o\ o\ o$ lead into the main retort.

The latter is constructed, preferably, of brick and iron, and communicates at its top, by a pipe, K, with the condenser D', similar to those at D, and having a pipe issuing at E', which leads to a fan, F' and thence through the safety apparatus H and spouts $s'$ to the grates B. Near the exit at E' the pipe is provided with a vertical branch, $n$, leading into a reservoir, (not shown,) where it dips into liquid, so as to be sealed thereby.

The condenser D' has at its top a pipe, Q, leading through a cooling-box, U, to the inner cylinder of the cascade-condenser $t$, to which it is attached at $e$. The details of the cascade-condenser are shown in Fig. 15. A closed cylinder of metal, $t$, contains two concentric open ones, $i$ and Z, the former dipping into liquid upon the annular trough $d''$, and the latter being similarly sealed at its bottom by liquid, whose level is maintained in the cylinder $t$ by means of the overflow-pipe $o$. The annular trough $d$ receives the liquid entering through the pipe $e'$, sealing the latter. Annular shelves $d'$ and $l$ are fixed upon the cylinder Z. The pipe $o$ is prolonged downward to a depth corresponding to the degree of exhaustion required in the condenser, being usually about nine feet in length, and enters the receptacle $m$, where its lower end is sealed by liquid. The excess in the vessel $m$ is withdrawn by the pipe $o'$. At $h$ is the connection for the pipe leading to the air-pump O. This pipe is preferably formed with two branches, attached respectively at the points $h'$ and $h''$; but if two cascade-condensers are used, each may be connected by a single pipe with one end of the pump.

The pump O is constructed in the usual way with a tight piston, W, valves $u\ u'$, controlling the entrances $h'\ h''$, and valves $v\ v'$, controlling the exits $i'i''$, respectively, the latter leading through safety apparatus H into the grate-chambers, or, if preferred, into the atmosphere.

The cooling-boxes U are constructed of metal, and are divided by vertical partitions into three separate compartments, as shown, the two outer or end ones being connected by metallic tubes running through the intermediate one, and the passage from the pipe Q to the cascade-condenser $t$ is continuous through these metallic tubes.

The pipes $r$ connect the middle compartment of the cooling-boxes, through which the tubes run, with the upper compartment of the condenser D'. The lower condensers, D D, are arranged with similar appliances, which, to avoid repetition, are not shown or described.

I represents the devices for introducing wood into the main retort, M, and will be more fully described hereinafter. The main retort M is heated by fires on closed grates B', whose flues communicate, like those at J, with the channel $a$ and spouts $o\ o\ o$. These flues can also be closed by dampers when not in action. The bottom of the main retort terminates in a spout, S, whose end dips into a vessel which contains liquid, to form a hydraulic seal. Iron bars $b\ b$, arranged so as to be withdrawn lengthwise, retain the wood and charcoal above.

R R represent metal cars, which can be run under the spout S and the bottom of the lesser retorts to receive the charcoal, R' R' being other cars, in which wood is brought over the lesser retorts and dumped therein. L L are flues which can be used, if desired, to carry off the hot gases and products of combustion from the fires at B. F is a fan by which air is supplied to the closed grates B. Figs. 2, 3, 4, and 5 represent the details of the lesser retorts, indicated by A on Fig. 1. These are preferably formed of boiler-iron, and may be either in several courses riveted together, as indicated in Fig. 5, or in one single piece. In transverse section they are crescent-shaped, as shown in Fig. 3, the concave side being presented to the fires, thus giving grating-surface, and enabling them to be combined with the fire-brick arch C, which forms a peculiar and useful feature.

The top and bottom are constructed with cast-iron necks, inclined at an angle, as shown at $e\ e$, to permit the easy introduction of wood and removal of charcoal, and are closed by lids $c'$ held in position by screw-clamps.

Prior to placing these retorts in position, I construct an arch of thin fire brick or plates of graphite, having the same curvatures as the concave surface of the retort, and inclined as shown in Fig. 1. When the retort-body is lowered upon this vault or arch, its weight retains the bricks firmly in position without the necessity of any fastening, and thus affords the requisite protection from the fire, while the absence of metallic or other fastenings between the brick-work and the retort avoids the danger of breakage by unequal expansion or from other causes.

Fig. 6 represents a section of the entire apparatus on a line running through $o\ o\ o\ o$ in Fig. 1, and showing the spout or neck S of the main retort, M, surrounded by the channels $a\ a\ a\ a$, from whence the tuyeres $o\ o\ o\ o$ extend into the retort. The prolongations $h\ h$ of the straight channels $a\ a$ enable these to be readily cleaned from the outside, and, when in use, $h\ h$ are closed by plugs.

The flues J' of the grates B' are also shown communicating with the channels $a\ a$. Six primary or lesser retorts, A, are shown in combination with the main one.

Fig. 7 shows the details of the condensers D and D'. These are of cast iron or other suitable metal, and are constructed in two entirely separate chambers, $d'$ and $d$. The upper communicates by the pipe Q with the cooling-boxes U and cascade-condensers $t$, already described. The lower chamber communicates with the retorts by the pipes K and pipes P, Fig. 1, whose ends dip downward, as shown at T, so that, when a small quantity of liquid is introduced, they are closed by a hydraulic seal. The exit-pipe is shown at E'.

The condenser shown in Fig. 7 is adapted to receive the pipes from two retorts, and is consequently placed between them, so that the pipes enter from opposite sides. The arrangement of the hydraulic seal at the points T is of great importance, as it prevents the gases from being forced back into the retorts or the communication of flame from the latter into the condenser.

Figs. 8, 9, and 10 represent the details of the safety apparatus H, which controls the passages into the spouts $s$ and $s'$ leading to the grates. Fig. 10 is a section on line $x\ x$, and Fig. 8 a section on line $z\ z$; Fig. 9, a section on line $y\ y$. A metallic box, $a'$, is kept filled with liquid to a certain level. The gases coming from the lesser retorts or from the fan F' are admitted through spouts T', which dip beneath the liquid, so as to form hydraulic seals. One or more outlets, V, are provided with puppet-valves $g$, having stems $g'$, acting as guides. These valves are surrounded by separate valve-chests M', to which are attached pipes $k$ leading to the spouts $s$ or $s'$. The liquid in the box $a'$ acts as a safety appliance in the same manner as that contained in the condensers, and prevents the communication of any local explosions, or of flame, to the retorts, fan, and pipes. The spouts $s\ s'$ are so adjusted upon the pipe $k$ that they can be slightly raised or lowered to admit of their being inserted into the grates B B' at any desired height.

The details of the special appliance for introducing wood into the main retort M are shown in Figs. 11, 12, 13, and 14, Fig. 12 being a section on line Y Y, and Fig. 11 a section on line X X. The retort M has at its top a square opening, closed by an iron lid, $b'$ $b'$, whose edges fit into a continuous channel or groove, $i$, surrounding the opening, and partly filled with fluid, to seal the joint. Within the opening is an iron lid, formed of two curved segments, $c$ $c$, which are closed at each end, and which fit together at bottom, while at top they are in close contact with a rim or flange, $q''$. One of these segments is pivoted upon pins $w$, the other upon sleeves $w'$, and they are respectively turned by the wheels $x$ and $y$ in opposite directions. When in the position shown in Fig. 11 they form a hollow semi-cylinder, closed at both ends, and consequently act as a tight lid, auxiliary to the lid $b'$ $b'$ of the retort. This lid $b'$ $b'$ is provided at its top with a stuffing-box, N', through which pass the rod $j$ and sleeve $j'$, worked respectively by wheels $x'$ and $y'$. The rod $j$ carries at its lower end a semi-cylinder of lattice-work, $f$, into whose ends at $q$ $q'$ are fitted pivots, upon which are suspended by arms A' two quarter-cylinders of iron lattice-work, A'' A'', which meet and fit closely together at the bottom. Chains L', winding upon barrels Q' Q', connect these lower quarter-cylinders, through the bevel-wheels $g''$, with the sleeves $j'$, so that they can be opened and closed by making quarter-revolutions upon the pivots $q$ $q'$. When closed, as shown in Figs. 11 and 12, they form a hollow cylinder of lattice-work concentric with and suspended over the auxiliary lids $c$ $c$. The entire system of lattice-work cylinder and outer lid $b'$ can be raised by a pulley attached at P' and swung aside upon a crane.

The operation of my apparatus is as follows: The main retort, M, and the lesser retorts, A, are filled with wood, the fires on the closed grates B are lighted, and the fans which supply air to these grates are started. The distilled gases and vapors rise freely from the heated side of the retorts A and pass into the condensers D, while the hot products of combustion from the grates B pass by the uptakes G and J into the channels $a$, surrounding the main retort, M, and are discharged into the latter through the spouts $o$ $o$ $o$, thus heating the bottom of the mass of wood therein. The first products of distillation from this heating in the retort M are condensed, and drip down into the neck S, where they are caught in the vessel attached thereto, and form a hydraulic seal which prevents the escape of gas.

The fires on the closed grates B' being then lighted and their fans started, distillation goes on from the whole mass of wood in M, and the distilled products pass by the pipe K into the condenser D'. This pipe K connects with the lower compartment, $d$, Fig. 7, and the vapors, on entering, bubble through the liquid at the bottom thereof, and are condensed by contact with the cold surface of the upper compartment, $d'$, the manner of cooling which will be explained hereinafter. As the condensed liquid rises in the compartment $d$ it flows out of the outlet E' and runs down by the pipe $n$, Fig. 1, into a reservoir. (Not shown.) The non-condensable gases in the condenser D' are drawn out at E' by the fan F', which forces them down through the pipe $m$ and safety apparatus H into one of the grate-chambers, B, where they are consumed, thus intensifying the heat.

The action of the safety apparatus, placed between the fan and spout $s$, is as follows: The gases from the fan enter by the pipe T' into the compartment $a'$, bubbling through the liquid in the latter. When the valve $g$ is raised the gases rush through the pipe $k$ into the spout $s'$, which, being adjustable, can be connected with any of the grates. Similar pipes of exit E, safety apparatus H, and spouts $s$ are connected with the lower condensers, D, which receive the products of distillation from the lesser retorts, A, and, as the pressure in the latter is considerable, the use of a fan to draw down the non-condensable gas may be dispensed with, and the connection be made direct between the condenser and safety apparatus, as shown in Fig. 1. The spouts $s$ may be connected with any one or more of the grates B. Care must be taken, however, that the pressure of air supplied to the grates shall not be so high as to force back the gases in the spouts.

If it is desired to use only the lesser retorts, A, the flues N are closed and those at L opened, thus preventing the entrance of products of combustion into the main retort, M, and conducting them instead into the chimney. In such cases the grates B' and fan F' are not used.

Even when the main retort is used in conjunction with the lesser ones, it may be found useful to close the flues N and open those at L for an interval, whenever it is found that the non-condensable gases coming from the upper condenser are so charged with carbonic-acid or other incombustible gas as to be no longer useful for burning.

The cooling in the condensers D and D' is effected as follows: Pyroligneous acid or other volatile liquid is introduced into the middle compartment of the box U, whence it flows by the pipe $r$ into the upper compartment, D', of the condenser. The air-pump of the cascade-condenser $t$ is then put in operation, and the acid in the compartment $d'$ is rapidly evaporated, thus cooling the walls and bottom and condensing the vapors in the lower compartment, $d$. At the same time the volatilized acid of the upper chamber is drawn through the cooling-box U by the pipes crossing the middle compartment, and, passing into the cascade-condenser $t$, is recondensed by the shower of cold pyroligneous acid, which, being introduced by the pipe $e'$, falls and splashes upon the shelves $d'$ $l'$ and the trough $d''$. The volatilized acid drawn in by the suction of the air-pump from the upper compartment, $d'$, follows the course indicated by the arrows in Fig. 15, and is consequently obliged to traverse the shower, so that only the non-condensable portions pass through the pump, and are forced into the grates or permitted to escape.

I thus at the same time purify the acid of the upper compartment by this redistillation and condense the crude acid coming from the wood by the cold produced from the evaporation.

The retorts A can be charged from the top and emptied from the bottom by simply removing the lids, the charcoal falling into the closed cars R; and not only can this be done without drawing the fire from beneath, but each retort can be charged or discharged while the others are in operation, since the hydraulic seal in the condensers prevents the exit of gas or vapor into the empty retort or the formation of an explosive mixture by the entrance of air into the condenser and pipes. The main retort, M, is charged from time to time while the process of distillation is going on therein, as follows: The auxiliary lids $c$ $c$ being tightly closed, the upper lid, $b'$ $b'$, and charging apparatus are raised by the pulley and swung over the wood, which is cut to a proper length and bound in fagots. These fagots are supported upon two thin uprights, $u$, as shown in Fig. 14. The sleeve $j'$ is then revolved and chains L wound upon the barrels Q, thus raising and opening the lattice quarter-cylinders A'' upon either side. The apparatus is then lowered upon the fagot, as shown in Fig. 14, and by reversing the wheel $y'$, the chains are unwound, so that the lattice-work quarter-cylinders descend and meet beneath the fagot, the uprights $u$ being avoided by means of the open spaces of the lattice. The bindings of the fagot are removed through the openings, and the wood is retained by the now closed cylinder of lattice-work.

The apparatus is then swung back into position, the lids $b'$ $b'$ fitting closely into its water-sealed channel $i$. The wheels $x$ and $y$ are then revolved in opposite directions, and the auxiliary lids $c$ $c$ are raised clear of the lattice quarter-cylinders. The rod and sleeve are then lowered through the stuffing-box N' until the suspended cylinder is free to revolve laterally inside the retort M, as shown at A' R' in Fig. 13, the revolution being effected by turning the wheel $x'$ and the rod $j$. The lattice-work quarter-cylinders are then separated and raised so that the wood falls into the retort. The lateral revolution of the cylinder within the retort enables the operator to discharge the wood in all directions, and thus insure equal distribution.

After the wood has fallen the apparatus is raised into the position shown in Fig. 11 and the auxiliary lids $c$ $c$ are closed.

The inside retort can thus be charged from time to time without interrupting the distillation going on therein. To discharge it, the grates or rods $b$ $b$, Fig. 1, are withdrawn, when the charcoal falls into and fills the neck or spout S. The rods are then replaced and the sealed vessel beneath is removed, permitting the charcoal to discharge into a closed car, R, beneath. The sealed vessel is then replaced and the car withdrawn.

The operation of my apparatus is thus continuous, it not being necessary to draw the fires from beneath any of the retorts, in order to charge or discharge the latter, and the use of closed grates with pressure-fans insures the free passage of the heated products of combustion into the main retort. The combustion of the non-condensable products and their continuous circulation through the main retort until no longer fit for use effect a great economy of fuel.

I am aware that it is not new to combine a condenser with a fan and spout, whereby the non-condensable products of distillation are driven into the fire-place and consumed; but hitherto these combinations have lacked the element of an intervening safety apparatus, which is essential in so utilizing the waste gases from the distillation of wood, especially when a system of several retorts communicate with the fire. I therefore disclaim these devices when such safety apparatus is wanting.

I do not claim the distilling of wood by passing through it the hot products of combustion, nor do I claim the combination of two or more retorts in such manner that the products of distillation of one pass directly into the other; nor do I claim the protection of a retort by fire-brick when the latter forms an envelope entirely surrounding the retort, or is fastened thereto by lugs or pins, nor when the fire-brick arch is perforated by passages or flues, so that the flame can play directly upon the retort, nor when the bottom of the retort has a different curvature from the arch, since none of these methods of construction are adapted to my improved retort and setting, the object of which is to completely protect the heating-surface by a shield of fire-brick so thin that it occasions no loss of heat, and yet maintained in position without the aid of fastenings, as before stated; but I desire to secure by Letters Patent, and claim as my invention—

1. In an apparatus for distilling wood, &c., the combination of a retort and condenser, having a pipe which communicates with the grate-chamber, with a safety apparatus, intermediate between the condenser and grate-chamber, whereby the passage of flame to the condenser is prevented, substantially as described.

2. The combination of the spout $s'$ and the exit-pipe of the condenser with the safety apparatus having the induction-pipe T', dipping into a sealing-liquid and a discharge-pipe controlled by a valve, substantially as described.

3. The combination of a retort with a fan and closed grate-chamber whose flue communicates with the interior of the retort, whereby the products of combustion from the grate are forced into the retort under pressure.

4. The combination, with a lesser retort, A, and main retort, M, of fans and closed grate-chambers having flues communicating with the main retort, and condensers D and D', communicating through safety apparatus with the grate-chambers, whereby the non-condensable gases from both retorts are burned and the products of combustion forced into the main retort under pressure.

5. The combination of a retort having a concave bottom with an arch or vault of refractory material, constructed independently of the retort, but in close contact throughout with the concave surface thereof, and maintained in position thereby, substantially as described.

6. The condensers D', formed in two separate compartments, $d$ and $d'$, the latter communicating with an air-pump or other equivalent exhausting device, whereby condensation is effected in the one compartment by the evaporation of a volatile liquid in the other.

7. The auxiliary lids $c\ c$, in combination with the rods $w$, sleeves $w'$, and wheels $x$ and $y$, or their equivalents, substantially as above described.

8. The combination of the lattice-work quarter-cylinders A'', revolving upon the pivots $q\ q'$, with the upper half-cylinder, $f$, lid $b$, barrels Q', rod $j$, and sleeve $j'$, substantially as described.

In witness whereof I have hereunto set my hand.

J. A. MATHIEU.

Witnesses:
 JOS. C. FRALEY,
 F. F. HALLOWELL.